(12) United States Patent
Murata

(10) Patent No.: US 11,805,389 B2
(45) Date of Patent: Oct. 31, 2023

(54) EVALUATION OF DEVICE PLACEMENT

(71) Applicant: International Business Machines Corporation, Armonk, NY (US)

(72) Inventor: Masayuki Murata, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 359 days.

(21) Appl. No.: 17/080,897

(22) Filed: Oct. 27, 2020

(65) Prior Publication Data

US 2022/0132270 A1 Apr. 28, 2022

(51) Int. Cl.
*G06F 17/18* (2006.01)
*H04W 16/18* (2009.01)
*G06N 7/01* (2023.01)
*H04W 4/02* (2018.01)
*H04W 4/029* (2018.01)

(52) U.S. Cl.
CPC ............ *H04W 4/025* (2013.01); *G06F 17/18* (2013.01); *G06N 7/01* (2023.01); *H04W 4/029* (2018.02); *H04W 16/18* (2013.01)

(58) Field of Classification Search
CPC ..... H04W 4/025; H04W 4/029; H04W 16/18; H04W 4/33; H04W 4/80; H04W 4/026; G06F 17/18; G06N 7/005; G06N 7/01; G01S 5/02; G01S 1/0423
See application file for complete search history.

(56) References Cited

U.S. PATENT DOCUMENTS

| 9,270,952 | B2 | * | 2/2016 | Jamtgaard | ............... G01S 17/00 |
| 9,615,347 | B1 | * | 4/2017 | Kerr | .................... G07F 17/3218 |
| 9,860,706 | B2 | | 1/2018 | Greenberger | |
| 10,514,437 | B2 | * | 12/2019 | Pajovic | ................. G01S 5/0252 |
| 2010/0121567 | A1 | * | 5/2010 | Mendelson | .......... G01C 21/206 |
| | | | | | 342/463 |

(Continued)

FOREIGN PATENT DOCUMENTS

| CN | 102880673 A | * | 1/2013 | ........... G01S 5/0252 |
| CN | 106851573 A | * | 6/2017 | ........... G01C 21/206 |

(Continued)

OTHER PUBLICATIONS

Roger L. Berger and George Casella. "Deriving Generalized Means as Least Squares and Maximum Likelihood Estimates". The American Statistician. vol. 46, No. 4 (Nov. 1992), pp. 279-282. Published by: Taylor & Francis, Ltd. (Year: 1992).*

(Continued)

*Primary Examiner* — Yuwen Pan
*Assistant Examiner* — Swati Jain
(74) *Attorney, Agent, or Firm* — Kelsey M. Skodje

(57) ABSTRACT

A placement of a set of devices in an environment is evaluated. At least a plurality of neighboring locations is selected for a target location in the environment. A probability of an estimated location conditioned on the target location is calculated for each of at least the plurality of neighboring locations as the estimated location by using an observation model for obtaining a set of observation values given a location under the placement. An evaluation metric is computed by using the probability calculated for each of at least the plurality of neighboring locations.

20 Claims, 12 Drawing Sheets

(56) References Cited

U.S. PATENT DOCUMENTS

| | | | |
|---|---|---|---|
| 2010/0246485 A1* | 9/2010 | Potkonjak | G01S 1/028 |
| | | | 370/328 |
| 2015/0119086 A1* | 4/2015 | Mirowski | G01C 21/206 |
| | | | 455/456.6 |
| 2016/0021544 A1* | 1/2016 | Potkonjak | H04W 84/20 |
| | | | 455/446 |
| 2018/0067187 A1* | 3/2018 | Oh | H04W 64/00 |
| 2018/0252528 A1* | 9/2018 | Zhuang | G01C 21/206 |
| 2018/0321353 A1 | 11/2018 | Patel et al. | |
| 2019/0182614 A1* | 6/2019 | Monogioudis | G01S 5/02521 |
| 2019/0277940 A1* | 9/2019 | Safavi | H04W 4/029 |
| 2019/0306724 A1* | 10/2019 | Guenot-Falque | H04W 16/20 |
| 2020/0018812 A1* | 1/2020 | Lindquist | G01S 5/0244 |
| 2020/0137532 A1* | 4/2020 | Ivanov | G01S 5/02524 |
| 2020/0150213 A1* | 5/2020 | Oh | G01S 5/14 |
| 2021/0092611 A1* | 3/2021 | Pasricha | H04K 3/22 |
| 2022/0300780 A1* | 9/2022 | Mahmood | H04W 4/80 |

FOREIGN PATENT DOCUMENTS

| | | | | |
|---|---|---|---|---|
| CN | 109059919 A | * | 12/2018 | G01C 21/206 |
| CN | 108495265 B | * | 7/2020 | H04W 4/02 |
| CN | 114491408 A | | 5/2022 | |
| DE | 102021123291 A1 | | 4/2022 | |
| EP | 3096155 B1 | * | 12/2020 | G01S 5/0252 |
| GB | 2602186 A | | 6/2022 | |
| JP | 2022070821 A | | 5/2022 | |
| WO | WO-2007133967 A2 | * | 11/2007 | G01S 11/06 |
| WO | WO-2016138800 A1 | * | 9/2016 | H04W 64/00 |

OTHER PUBLICATIONS

Huang, R. and Záruba, G.V., 2009. Monte Carlo localization of wireless sensor networks with a single mobile beacon. Wireless Networks, 15(8), pp. 978-990 (Year: 2009).*

Localization, Beacon Placement and Mapping for Range-Based Indoor Localization Systems, Ph.D. Thesis, Niranjini Rajagopal, Carnegie Mellon University, PA. (Year: 2019).*

Paul, S., Chakraborty, A. and Banerjee, J.S., 2019. The extent analysis based fuzzy AHP approach for relay selection in WBAN. In Cognitive Informatics and Soft Computing (pp. 331-341). Springer, Singapore. (Year: 2019).*

Ph.D. Thesis, "Localization, Beacon Placement and Mapping for Range-Based Indoor Localization Systems", Carnegie Mellon University, Pittsburgh, PA, Aug. 2019 (Year: 2019).*

Behboodi, A., Lemic, F., & Wolisz, A. (2017). A mathematical model for fingerprinting-based localization algorithms. Ithaca: Cornell University Library, arXiv.org. (Year: 2017).*

Danis FS, Cemgil AT. Model-Based Localization and Tracking Using Bluetooth Low-Energy Beacons. Sensors (Basel). Oct. 29, 2017;17(11):2484. doi: 10.3390/s17112484. (Year: 2017).*

Z. Chen and H. Fan, "The research and improvement of indoor localization algorithms based on RSSI," Proceedings of 2013 3rd International Conference on Computer Science and Network Technology, Dalian, China, 2013, pp. 178-181, doi: 10.1109/ICCSNT.2013.6967090. (Year: 2013).*

Luigi Bruno, Paolo Addesso, Rocco Restaino, "Indoor Positioning in Wireless Local Area Networks with Online Path-Loss Parameter Estimation", The Scientific World Journal, vol. 2014, Article ID 986714, 12 pages, 2014. https://doi.org/10.1155/2014/986714 (Year: 2014).*

T. Guan, W. Dong, D. Koutsonikolas, G. Challen and C. Qiao, "Robust, Cost-Effective and Scalable Localization in Large Indoor Areas," 2015 IEEE Global Communications Conference (GLOBECOM), San Diego, CA, USA, 2015, pp. 1-6, doi: 10.1109/GLOCOM.2015.7417365. (Year: 2015).*

A. Tahat, G. Kaddoum, S. Yousefi, S. Valaee and F. Gagnon, "A Look at the Recent Wireless Positioning Techniques With a Focus on Algorithms for Moving Receivers," in IEEE Access, vol. 4, pp. 6652-6680, 2016, doi: 10.1109/ACCESS.2016.2606486. (Year: 2016).*

D. Li, B. Zhang and C. Li, "A Feature-Scaling-Based k-Nearest Neighbor Algorithm for Indoor Positioning Systems," in IEEE Internet of Things Journal, vol. 3, No. 4, pp. 590-597, Aug. 2016, doi: 10.1109/JIOT.2015.2495229. (Year: 2016).*

N. Rajagopal, S. Chayapathy, B. Sinopoli and A. Rowe, "Beacon placement for range-based indoor localization," 2016 International Conference on Indoor Positioning and Indoor Navigation (IPIN), Alcala de Henares, Spain, 2016, pp. 1-8, doi: 10.1109/IPIN.2016.7743626. (Year: 2016).*

Examination Opinion, Application No. GB2114292.2, dated Apr. 13, 2022, 4 pgs.

Response to Examination Opinion, Application No. GB2114292.2, dated Oct. 26, 2022, 20 pgs.

Bishop et al. "Optimality analysis of sensor-target localization geometries." Automatica 46.3 (2010): pp. 479-492.

Falque et al., "Optimizing Placement and No. of RF Beacons to Achieve Better Indoor Localization", 2018 IEEE International Conference on Robotics and Automation (ICRA), 2018, pp. 2304-2311.

Zuo et al., "Indoor Positioning Based on Bluetooth Low-Energy Beacons Adopting Graph Optimization," Sensors, 2018, 18, 3736, pp. 1-20.

Wang et al., "Efficient Beacon Placement Algorithms for Time-of-Flight Indoor Localization," SIGSPATIAL '19, Nov. 2019, 10 pages, ACM.

Martins et al., "Intelligent beacon location and fingerprinting," Procedia Computer Science, The 10th International Conference on Ambient Systems, Networks and Technologies (ANT), 2019, pp. 1-8, Elsevier.

* cited by examiner

EVALUATION OF DEVICE PLACEMENT

BACKGROUND

The present disclosure, generally, relates to support technology for placing a set of devices, more particularly, to a method of evaluating placement of a set of devices in an environment.

To provide navigation applications available in indoor environments, various indoor localization (or positioning) techniques have been investigated. Among those localization techniques, techniques based on monitoring the radio signal strength, so called RSS (Received Signal Strength) of Wi-Fi™ or Bluetooth™ Low Energy (BLE), is one of the most promising approaches because of its relative low infrastructure cost, no need for special hardware and potentially high accuracy.

SUMMARY

According to embodiments, disclosed are a method, system, and computer program product.

According to embodiments of the present disclosure, a computer-implement method of evaluating placement of a set of devices in an environment is provided. The method includes selecting at least a plurality of neighboring locations for a target location in the environment. The method also includes calculating a probability of an estimated location conditioned on the target location for each of at least the plurality of neighboring locations as the estimated location by using an observation model for obtaining a set of observation values given a location under the placement. The calculating may be performed approximately. The method further includes computing an evaluation metric by using the probability calculated for each of at least the plurality of neighboring locations.

Computer systems and computer program products relating to one or more aspects of the present disclosure are also described and claimed herein.

According to embodiments of the present disclosure, a computer-implement method of evaluating placement of a set of devices in an environment is provided. The method includes calculating an evaluation metric based on a function $\tilde{p}_0(\hat{x};x)$ of an estimated location $\hat{x}$ conditioned on a target location $x$ and outputting the evaluation metric. The evaluation metric is evaluated by using a probability distribution $p(\hat{x}|x)$. The probability distribution $p(\hat{x}|x)$ is calculated as an arithmetic mean $E_p(r|x)$ of a probability distribution $p(\hat{x}|r)$ of the estimated location $\hat{x}$ conditioned on a set of observation values r with respect to the set of predicted observation values r at the target location x and approximated by the function $\tilde{p}_0(\hat{x};x)$. The function $\tilde{p}_0(\hat{x};x)$ is obtained by replacing the arithmetic mean $E_{p(r|x)}$ with a geometric mean $G_{p(r|x)}$.

Additional features and advantages are realized through the techniques of the present disclosure. Other embodiments and aspects of the disclosure are described in detail herein and are considered a part of the claimed invention.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
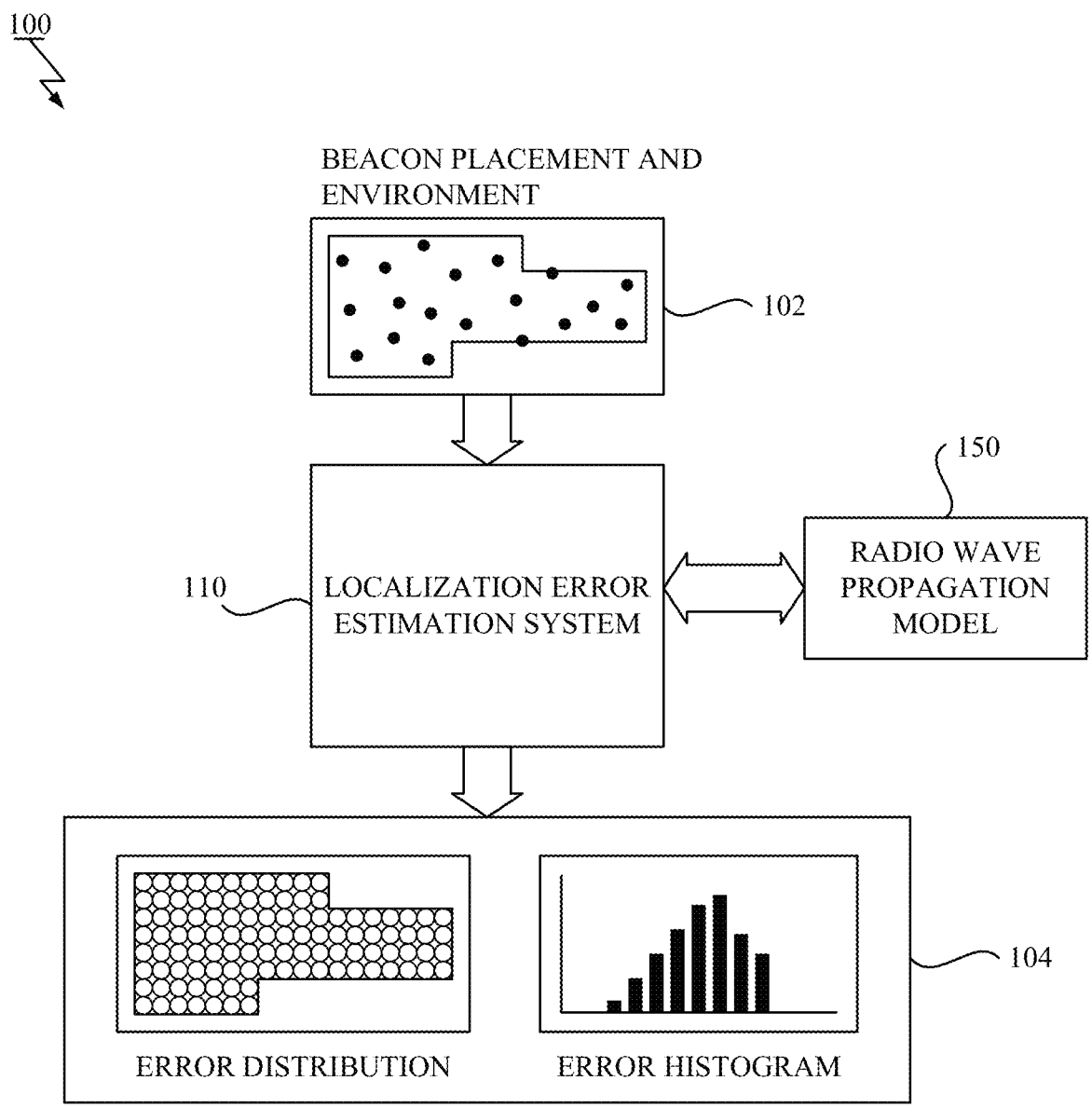
FIG. 1 illustrates a block diagram of a system for evaluating beacon placement, including a localization error estimation system according to some embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Hereinafter, the present disclosure will be described with respect to particular embodiments, but it will be understood by those skilled in the art that the embodiments described below are mentioned only by way of examples and are not intended to limit the scope of the present disclosure.

To provide navigation applications available in indoor environments, various indoor localization (or positioning) techniques have been investigated. Among those localization techniques, techniques based on monitoring the radio signal strength, so called RSS (Received Signal Strength) of Wi-Fi™ or Bluetooth™ Low Energy (BLE), is one of the most promising approaches because of its relative low infrastructure cost, no need for special hardware and potentially high accuracy.

The BLE based localization technique may require additional installation of signal emitting devices, such as beacons. However, because designing device placement may require expert knowledge on the indoor localization method, scaling beacon-based localization systems is still a challenging task.

Therefore, there may be a need for a novel technique capable of evaluating placement of devices with balanced computational cost and evaluation accuracy.

One or more embodiments, according to the present disclosure, are directed to computer-implement methods, computer systems, and computer program products for evaluating placement of a set of devices in a target environment. The placement of the set of devices (beacon placement) for indoor localization is determined, as is a localization error for a target location in a target environment or space. Where the beacons will be installed is computed as an evaluation metric for evaluating the placement.

Hereinafter, first referring to FIGS. 1-3, a computer system for evaluating beacon placement for the indoor localization according to some embodiments of the present disclosure will be described. Then, referring to FIGS. 4-7, a computer-implemented method for evaluating beacon placement for the indoor localization according to some embodiments of the present disclosure will be described. Then, with reference to FIGS. 8-11, experimental studies on a novel beacon placement evaluation according to some embodiments of the present disclosure will be described. Finally, referring to FIG. 12, a hardware configuration of a computer system according to one or more embodiments of the present disclosure will be described.

System Configuration

Hereinafter, referring to FIG. 1, a block diagram of a system for evaluating beacon placement, including a localization error estimation system according to some embodiments of the present disclosure, is described.

As shown in FIG. 1, the system 100 may include a localization error estimation system 110 for performing localization error estimation, and a radio wave propagation model 150 used in combination with the localization error estimation system 110.

The localization error estimation system 110 may be configured to receive input data describing a condition for the localization error estimation and output a result of the localization error estimation under the given condition.

The condition of the localization error estimation may include a target environment and placement of a set of beacons in the target environment 102 and may include one or more parameters for the localization error estimation.

The beacon whose placement is to be evaluated may be a beacon of BLE or Wi-Fi™ used for the indoor localization based on monitoring RSS (Received Signal Strength) thereof. In some embodiments, each beacon is a signal emitting device that may broadcast or emit its identifier through radio waves and may be fixed at a specific position to cover a particular area. The beacon may generally be defined as a device that transmits a signal by way of physical phenomenon such as radio waves, sound waves, light, and the like. Note that an "access point" used in the Wi-Fi based indoor localization may also be included in the scope of the term "beacon."

In the beacon-based indoor localization, a receiver may receive radio waves emitted from the beacons placed at particular positions in the target environment and may estimate the receiver's own location based on the RSS obtained from the beacons. The receiver may be any device, and examples of the receiver may include, but are not limited to, a smartphone, a tablet computer, a smart suitcase, a robot, and so on.

The target environment where the set of the beacons is to be placed may be given in a form of two-dimensional (2D) data in some embodiments. A target area where radio wave propagates and the receiver can move may be defined as a geometric shape in the target environment. The target area may include passages and room spaces in buildings, for example, in a case of the indoor localization. The number of beacons and positions of the beacons may be defined in the target environment. In some embodiments, one or more obstacles (e.g., a wall, a window, etc.) that attenuate, reflect, and/or diffract the radio waves may also be placed in the target environment.

In the some embodiments the location (or position) and distance between two locations may be given in two-dimensional coordinates (e.g., (x, y), (latitude, longitude). However, two-dimensional is an example, and three-dimensional coordinates (e.g., (x, y, z), (latitude, longitude, level/altitude)) may also be contemplated in some embodiments.

As for the parameters, the granularity of the localization error estimation (e.g., grid size/resolution) may be given. Also, parameters of the radio wave propagation model may also be given in the condition of the localization error estimation.

The radio wave propagation model 150 may provide the characterization of the radio wave propagation and predicts the RSS as a function of the distance (or range) between the beacon and the receiver. In some embodiments, the radio wave propagation model 150 may also consider an azimuth angle with respect to a reference direction in place of or in addition to the distance. The radio wave propagation model 150 may provide, to the localization error estimation system 110, an observation model (or a probability distribution) of observing an RSS vector (or a set of RSS values) conditioned on a location, e.g., a model of how much strength to observe from a plurality of beacons at the given location.

Examples of the radio wave propagation model includes, but is not limited to, LDPL (Log-Distance Path Loss) model that predicts the path loss a signal encounters in the target environment over the distance. The aforementioned condition may include the path loss at the reference distance when the LDPL model is employed. Other examples of the radio wave propagation model may include ITU (International Telecommunication Union) model for indoor attenuation, models for outdoor attenuation such as ITU terrain model, models for free space attenuation such as free-space path loss, etc.

The result 104 given by the localization error estimation system 110 for the give condition may include, but is not limited to, a localization error estimated for an arbitrary location, a map of a localization error distribution over the target environment, a graphical representation of statistical analysis of the estimated localization errors such as histogram, statistics (e.g., means, medians, quantiles, etc.) of the estimated localization errors or combination thereof.

In a particular use case, an operator may input 102 a candidate of the beacon placement into the localization error estimation system 110 and obtain 104 an evaluation result for the candidate, which can be further used to update the candidate of the beacon placement for subsequent estimation. The operator may interactively design the beacon placement by checking the localization error distribution computed for the candidates of the beacon placement.

In other particular use case, an operator may enumerate a plurality of candidates of the beacon placement in advance by performing site survey, for example, and can select the best subset of the candidates based on a statistic of the localization errors computed for the plurality of candidates of the beacon placement. The operator may perform optimization of the beacon placement to optimize the statistic (e.g., minimize the mean of the localization errors) by varying the condition such as positions of the beacons.

Figure 2:
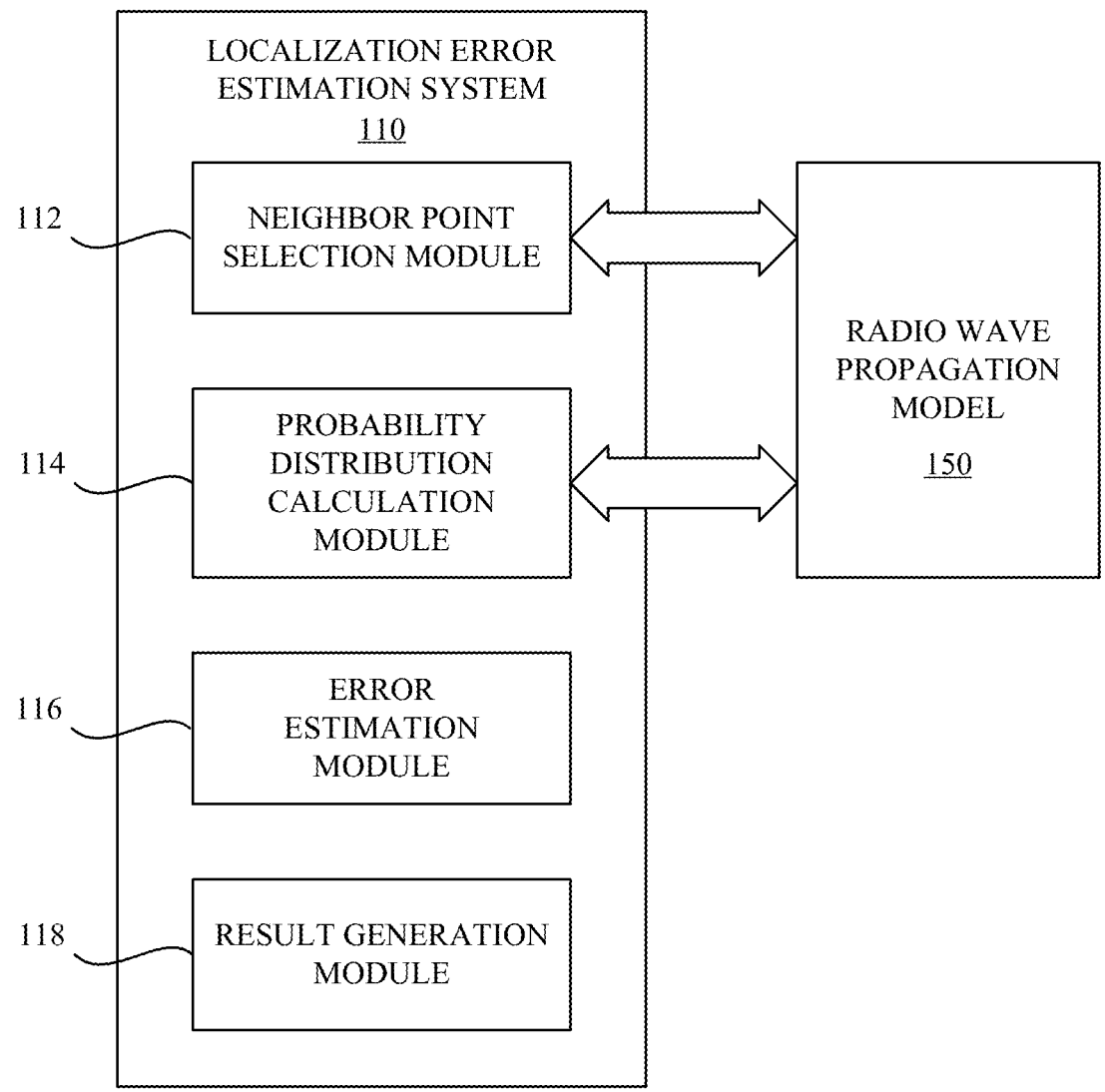
FIG. 2 illustrates a detailed block diagram of a localization error estimation system according to some embodiments of the present disclosure.

FIG. 2 includes more details regarding a localization error estimation system according to some embodiments of the present disclosure is described. FIG. 2 illustrates a detailed block diagram of the localization error estimation system 110. The localization error estimation system 110 shown in FIG. 2 may include a neighbor point selection module 112; a probability distribution calculation module 114; an error estimation module 116; and a result generation module 118. Localization and Localization Error Before describing each of the modules 112-118 constituting the localization error estimation system 110, a way of estimating a location of a receiver and a way of evaluating a localization error for the given beacon placement are described.

Estimating the location of the receiver from an RSS vector obtained from beacons may be a task of traversing causality of observing the RSS vector at a given arbitrary location in reverse. Here, an observation model representing a relationship of observing an RSS vector $r (=(r1,\ldots,rM)T)$ at a location $x (=(x, y)T)$ under the given placement $Xb(= (xb1,\ldots, xbM))$ may be defined. Note that M may be the number of beacons placed in the target environment. Since the value of the strength of the received signal observed at the given location would fluctuate due to various factors, the observation model may be appropriately represented by a conditional probability distribution $p(r|x)$ of observing the RSS vector $r$ conditioned on the given location $x$. Based on the conditional probability distribution $p(r|x)$, the location of the receiver $x$ may be estimated as a probability $p(x|r)$ of a location $x$ given that a RSS vector $r$ is observed. The RSS vector $r$ may be a set of observation values in some embodiments.

Given the observation model $p(r|x)$, a localization error may be evaluated as a variance or the square root of the variance of a probability distribution $p(x\hat{}|x)$ of an estimated location $x\hat{}$ conditioned on a true location $x$. The probability distribution $p(x\hat{}|x)$ may be calculated as an arithmetic expectation of a posterior probability distribution $p(x\hat{}|r)$ of the estimated location $x\hat{}$ conditioned on a RSS vector $r$ with respect to the RSS vector $r$ predicted at the true location $x$ as follows:

$$p(\hat{x}|x) = \int p(\hat{x}|r)p(r|x)dr = E_{p(r|x)}[p(\hat{x}|r)] = E_{p(r|x)}\left[\frac{p(r|\hat{x})}{\int p(r|\hat{x})d\hat{x}}\right]$$

Note that a parameter with a hat (^) accent in an equation represents an estimated value of a particular parameter and may be denoted as "b^" where 'b' represents the particular parameter and '^' represents the hat in the sentences of the specification.

Because it is difficult to compute the expectation in the right side of the aforementioned equation (1), in some embodiments, the localization error may be calculated approximately based on an alternative function $\tilde{p}_0(\hat{x}|x)$, which approximate the probability distribution $p(x\hat{}|x)$ as follows:

$$\tilde{p}_0(\hat{x};x) = \frac{G_{p(r|x)}[p(\hat{x}|r)]}{\int G_{p(r|x)}[p(\hat{x}|r)]d\hat{\xi}} = \frac{\exp[E_{p(r|x)}[\log p(r|\hat{x})]]}{\int \exp[E_{p(r|x)}[\log p(r|\hat{\xi})]]d\hat{\xi}}$$

$$\because G[X] = \lim_{n\to\infty}\left(\prod_{i=1}^{n}X_i\right)^{\frac{1}{n}} = \exp\left[\lim_{n\to\infty}\frac{1}{n}\sum_{i=1}^{n}\log X_i\right] = \exp[E[\log X_i]]$$

Where the arithmetic expectation (mean) $Ep(r|x)$ in the equation (1) may be approximated by the geometric expectation (mean) $Gp(r|x)$ and besides a normalizing constant may be multiplied so that the function $\tilde{p}_0(\hat{x}|x)$ (alternatively, $p\sim0(x\hat{}|x)$) satisfies the normalization condition. The X in the second equation may be a random variable. Note that a function with a tilde (~) accent in an equation may represent an approximated function and may be denoted as "f~" where f represents the function, in the sentence of the specification. Also note that $\xi\hat{}$ may be an alternative to the estimated position $x\hat{}$ for the normalization.

As described above, the alternative function $p\sim0(x\hat{}|x)$ may be obtained by replacing the arithmetic expectation (mean) $Ep(r|x)$ with the geometric expectation (mean) $Gp(r|x)$ in the equation (1). The geometric expectation (mean) $Gp(r|x)$ may be normalized by the normalizing constant (denominators in the equation (2)) so that the function $p\sim0(x\hat{}|x)$ satisfies the normalization condition, thereby treating the alternative function $p\sim0(x\hat{}|x)$ as a probability.

The function $p\sim0$ $(x\hat{}|x)$ may be easy to calculate because it contains merely the arithmetic expectation of the log-likelihood $Ep(r|x)[\log p(r|x\hat{})]$, which can be analytically evaluated.

As a scalar metric for evaluating a localization error for an arbitrary location $x$, the mean squared error $E[(x\hat{}-x)2]$ may be approximately evaluated by using the function $p\sim0(x\hat{}|x)$. Especially, the mean squared error $E[(x\hat{}-x)2]$ is computed by numerical integration as follows:

$$E_{p(\hat{x}|x)}[(\hat{x}-x)^2] = \int (\hat{x}-x)^2 p(\hat{x}|x)d\hat{x} \approx$$

$$\int (\hat{x}-x)^2 \tilde{p}_0(\hat{x}|x)d\hat{x} \approx \sum_{j\in N_x}(\hat{x}^{(j)}-x)^2 \frac{\exp[E_{p(r|x)}[\log p(r|\hat{x}^{(j)})]]}{\sum_{k\in N_x}\exp[E_{p(r|x)}[\log p(r|\hat{x}^{(k)})]]}$$

A set of discrete points may be defined in the target environment for the numerical integration, $x\hat{}(j)$ denotes the j-th discrete point in a region where the function $p\sim0(x\hat{}|x)$ may be expected to be large and $Nx$ denotes a subset of discrete points in the region.

Note that MSE may be employed as a evaluation metric in the aforementioned equation (3). However, other error metrics such as MAE (Mean Absolute Error), RMSE (Root Mean Squared Error), RMSPE (Root Mean Square Percentage Error), MAPE (Mean Absolute Percentage Error), and the like may also be contemplated. Note that MSE may correspond to a variance of the probability distribution $p(x\hat{}|x)$ and RMSE corresponds to the square root of the variance of the probability distribution $p(x\hat{}|x)$.

Derivation of Alternative Function p(x̂|x)

Hereinafter, more detail of the approximation of the probability distribution p(x̂|x) is described. The probability distribution p(x̂|x) of an estimated location x^ conditioned on a true location x may be evaluated as the expectation of the posterior probability distribution p(x̂|r) with respect to a set of at least one RSS r as follows:

$$p(\hat{x}|x) = \int p(\hat{x}|r)p(r|x)dr = E_{p(r|x)}[p(\hat{x}|r)] = \lim_{n\to\infty} \frac{1}{n}\sum_{i=1}^{n} p(\hat{x}|r^{(i)})$$

Let $\tilde{p}_q(\hat{x}|x)$ be the approximated probability density function, in which the expectation $E_{p(r|x)}[p(\hat{x}|r)]$ may be replaced by a generalized mean $M_{p(r|x)}^q[p(\hat{x}|r)]$ and a normalizing constant is multiplied so that $\tilde{p}_q(\hat{x}|x)$ satisfies the normalization condition, as follows:

$$\tilde{p}_q(\hat{x}|x) = \frac{M_{p(r|x)}^q[p(\hat{x}|r)]}{\int M_{p(r|x)}^q[p(\hat{\xi}|r)]d\hat{\xi}}, \text{ where}$$

$$M_{p(r|x)}^q[p(\hat{x}|r)] = \lim_{n\to\infty}\left(\frac{1}{n}\sum_{i=1}^{n} p(\hat{x}|r^{(i)})^q\right)^{1/q}$$

When q=1, the approximated probability density function $\tilde{p}_1(\hat{x}|x)$ corresponds to the original probability density function p(x^|x).

As an alternative function that approximates the original probability density function p(x̂|x), a geometric mean (which is obtained by taking the limit as q approaches zero (q→0) may be used in place of the arithmetic mean (q=1) as follows:

$$\tilde{p}_0(\hat{x}|x) =$$

$$\lim_{q\to 0}\tilde{p}_q(\hat{x}|x) = \frac{G_{p(r|x)}[p(\hat{x}|r)]}{\int G_{p(r|x)}[p(\hat{\xi}|r)]d\hat{\xi}} = \frac{G_{p(r|x)}\left[p(r|\hat{x})\big/\int p(r|\hat{x})d\hat{x}\right]}{\int G_{p(r|x)}\left[p(r|\hat{\xi})\big/\int p(r|\hat{x})d\hat{x}\right]d\hat{\xi}} =$$

$$\frac{G_{p(r|x)}[p(r|\hat{x})]}{\int G_{p(r|x)}[p(r|\hat{\xi})]d\hat{\xi}} = \frac{\exp[E_{p(r|x)}[\log p(r|\hat{x})]]}{\int \exp[E_{p(r|x)}[\log p(r|\hat{\xi})]]d\hat{\xi}}$$

$$\because G_X[X] = \lim_{n\to\infty}\left(\prod_{i=1}^{n} X_i\right)^{\frac{1}{n}} = \exp\left[\lim_{n\to\infty}\frac{1}{n}\sum_{i=1}^{n}\log X_i\right] = \exp[E_X[\log X_i]]$$

As described above, the approximated probability distribution p~0(x^|x) may be computed easily in comparison with the original probability density function p(x^|x) since it contains merely term $E_{p(r|x)}[\log p(r|\hat{x})]$, which can be analytically evaluated and calculated in a manner based on the given observation model p(r|x).

Example Form of Observation Model P(R|X)

The observation model p(r|x) may be given as a product of probabilities p(ri|x) for the plurality of beacons (i={1, . . . , M}). When the radio wave propagation model is the LDPL model, a specific form of the observation model p(r|x) may be given as follows:

$$p(r|x) = \prod_{i=1}^{M} p(r_i|x) = \prod_{i=1}^{M} \frac{1}{\sqrt{2\pi}}\exp\left[-\frac{(r_i - m_i(x))^2}{2\sigma^2}\right], \text{ where}$$

$$m_i(x) = P_0 - 10\gamma'\log d_i(x)$$

Figure 3:
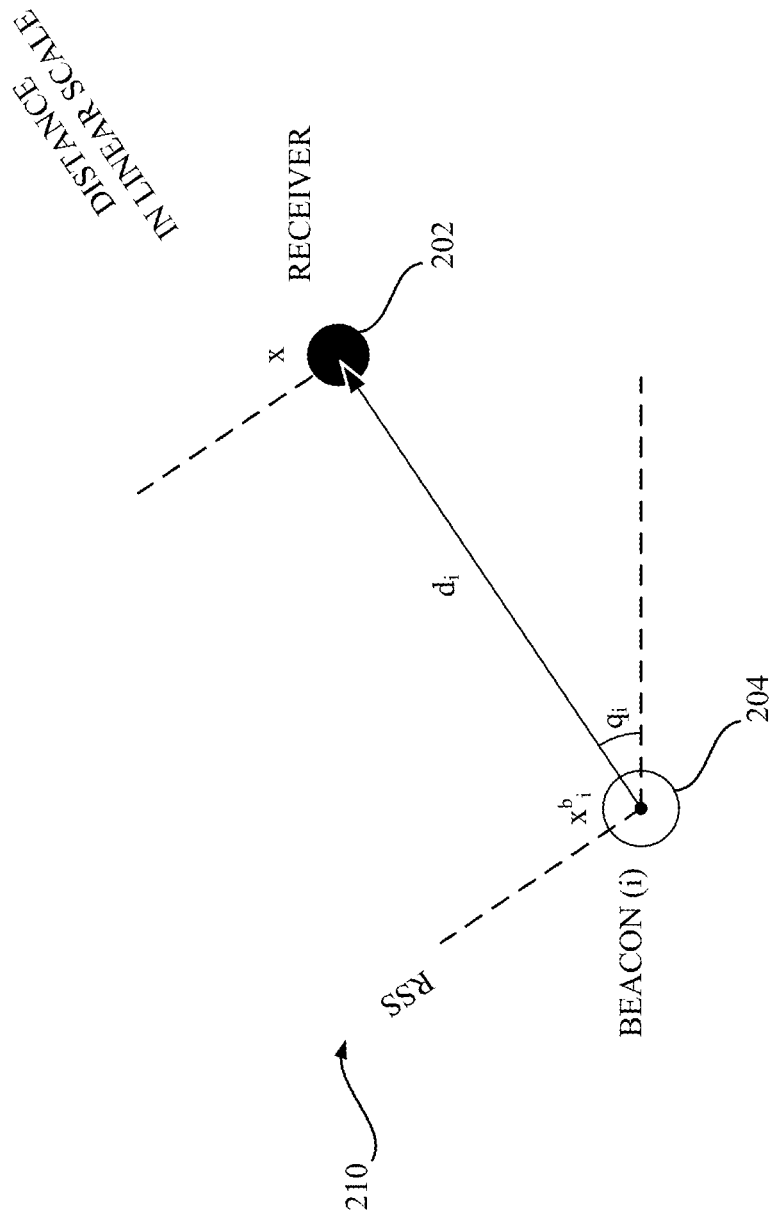
FIG. 3 illustrates a schematic of a radio wave propagation model used in combination with the localization error estimation system according to some embodiments of the present disclosure.

FIG. 3 illustrates a schematic of the radio wave propagation model 150 used in combination with the localization error estimation system 110. As illustrated in a graph 210 of FIG. 3, as the distance di between the location x of the receiver 202 and the position xbi of the beacon (i) 204 increases, the strength of the received signal of the radio wave (RSS) may decrease. In some embodiments, it is assumed that the RSS of each beacon may follow a normal distribution having a mean mi (x) and a standard deviation σ, N(r; mi(x), σ2). However, other distribution for the RSS may also be contemplated.

Note that the LDPL model may be an example of the radio wave propagation model and a more sophisticated radio wave propagation model or simulator may also be employed. In some embodiments, a radio wave propagation model that considers an azimuth angle of the direction of the receiver 202 from the beacon (i) 204 with respect to a reference direction, qi, in place of or in addition to the distance di(x) may also be employed. The radio wave propagation model may correspond to a signal propagation model in some embodiments.

Details about Modules in Localization Error Estimation System

Referring back to FIG. 2, the modules 112-118 of the localization error estimation system 110 are described in more detailed.

The neighbor point selection module 112 may be configured to select at least a plurality of neighboring locations x^(j) for each target location x(i) in the target environment where the function p~0(x^(j)|x(i)) is expected to be large. In some embodiments, a set of discrete points may be defined in the target environment. Each of the neighboring locations x^(j) and the target location x(i) may be given as one of the discrete points in the set. The set of the neighboring locations x^(j) for the target location x(i) may be denoted by Nx(i). Among all discrete points defined in the target environment, an index j may be added to the set of the neighboring locations Nx(i) when the discrete point x^(j) satisfies a predetermined condition. The index may be a metric to determine the quality of placement—for example, to measure the effectiveness of placement.

In some embodiments, the plurality of neighboring locations may be selected by finding a location within a range determined by the RSS vector r(x(i)) predicted at the target location x(i) in a manner based on the observation model p(r|x). The predetermined condition by which the neighboring locations are selected will be described later in more detail.

The probability distribution calculation module 114 may be configured to calculate approximately, for each target location x(i), the probability distribution p~0(x^(j)|x(i)) of the estimated location x^(j) conditioned on the target location x(i) over the neighboring locations x^(j) (j is included in Nx(i)) by using the observation model p(r|x) that is provided by the radio wave propagation model 150.

In some embodiments, the probability p~0(x^(j)|x(i)) of the estimated location x^(j) conditioned on the target location x(i) may be calculated by computing the geometric mean Gp(r|x(i)). The geometric mean Gp(r|x(i)) may be calculated by computing an arithmetic expectation (mean) of a log-likelihood of an estimated location x^(j) with respect to a RSS vector r(x(i)) predicted at the target location x(i), $E_{p(r|x(i))}[\log p(r|x^{\wedge}(j))]$, and by computing an exponential of the expectation, $\exp[E_{p(r|x(i))}[\log p(r|x^{\wedge}(j))]]$. The geometric mean Gp(r|x(i)) may be normalized by the normalizing constant that can be calculated from expectations $E_{p(r|x(i))}[\log p(r|x^{\wedge}(j))]$ computed for the set of neighboring locations x^(j) (j is included in Nx(i)). As described above, the geometric mean Gp(r|x(i)) normalized by the normalizing constant may approximate the probability distribution p(x^|x(i)) of the estimated location x^ conditioned on the target location x(i). The geometric mean Gp(r|x(i)) may be suitable for a case where the observation model p(r|x) is given in a form of a product of the probabilities p(ri|x) for the beacons (i={1, ..., M}) with normal distributions.

In some embodiments, the probability p~q(x^(j)|x(i)) of the estimated location x^(j) conditioned on the target location x(i) may be calculated by computing a special case of the generalized means of a likelihood of an estimated location x^(j) with respect to a RSS vector r(x(i)) predicted at the target location x(i), Mqp(r|x(i))[p(x^(j)|r)], which may be normalized by the normalizing constant. When taking the limit as q approaches zero (q→0)), the special case may be the geometric mean Gp(r|x(i)) and the probability p~q(x^(j) |x(i)) may be equivalent to that of some embodiments. Depending on the specific of the observation model p(r|x), other special cases of the generalized means Mqp(r|x(i)) may also be contemplated.

The error estimation module 116 may be configured to compute an evaluation metric for each target location x^(i) by using the probability distribution p~0(x^(j)|x(i)) calculated over the neighboring locations x^(j) (j is included in Nx(i)). In some embodiments, the evaluation metric for evaluating a localization error may be defined as a variance of the probability distribution p~0(x^(j)|x(i)) as follows:

$$E_{p(\hat{x}|x)}[(\hat{x}-x)^2] = \int (\hat{x}-x)^2 p(\hat{x}|x)d\hat{x} \approx$$

$$\int (\hat{x}-x)^2 \tilde{p}_0(\hat{x}|x)d\hat{x} \approx \sum_{j \in N_x} (\hat{x}^{(j)}-x)^2 \frac{\exp[E_{p(r|x)}[\log p(r|\hat{x}^{(j)})]]}{\sum_{k \in N_x} \exp[E_{p(r|x)}[\log p(r|\hat{x}^{(k)})]]}$$

The target location x(i) may be varied within the set of discrete points X (={x(1), x(2), ..., x(N)}). Thus, the evaluation metric may be obtained for each of the target locations in the set X (={x(1), x(2), ..., x(N)}). The result generation module 118 may be configured to generate at least one selected from a group consisting of an localization error estimated for an arbitrary location x(i), a map of a localization error distribution over the target environment X (={x(1), x(2), ..., x(N)}), a graphical representation of statistical analysis of the estimated localization errors such as a histogram, statistics (e.g., means, medians, quantiles, etc.) of the estimated localization errors or combination thereof, and output them.

In some embodiments, the error estimation module 116 may be further configured to generate an indication of weak points and/or an improvement plane for the given beacon placement based on the aforementioned result by performing rule-based analysis, machine learning, etc.

In some embodiments, the localization error estimation system 110 and the radio wave propagation model 150 described in FIG. 1 and the modules 112-118 of the localization error estimation system 110 described in FIG. 2 may be implemented as a software module including program instructions and/or data structures in conjunction with hardware components such as a processor, a memory, etc.; as a hardware module including electronic circuitry; or as a combination thereof.

Modules 112-118 may be implemented on a single computer device such as a personal computer and a server machine or over a plurality of devices in a distributed manner such as a computer cluster of computer devices, client-server system, cloud computing system, edge computing system, etc.

Figure 4:
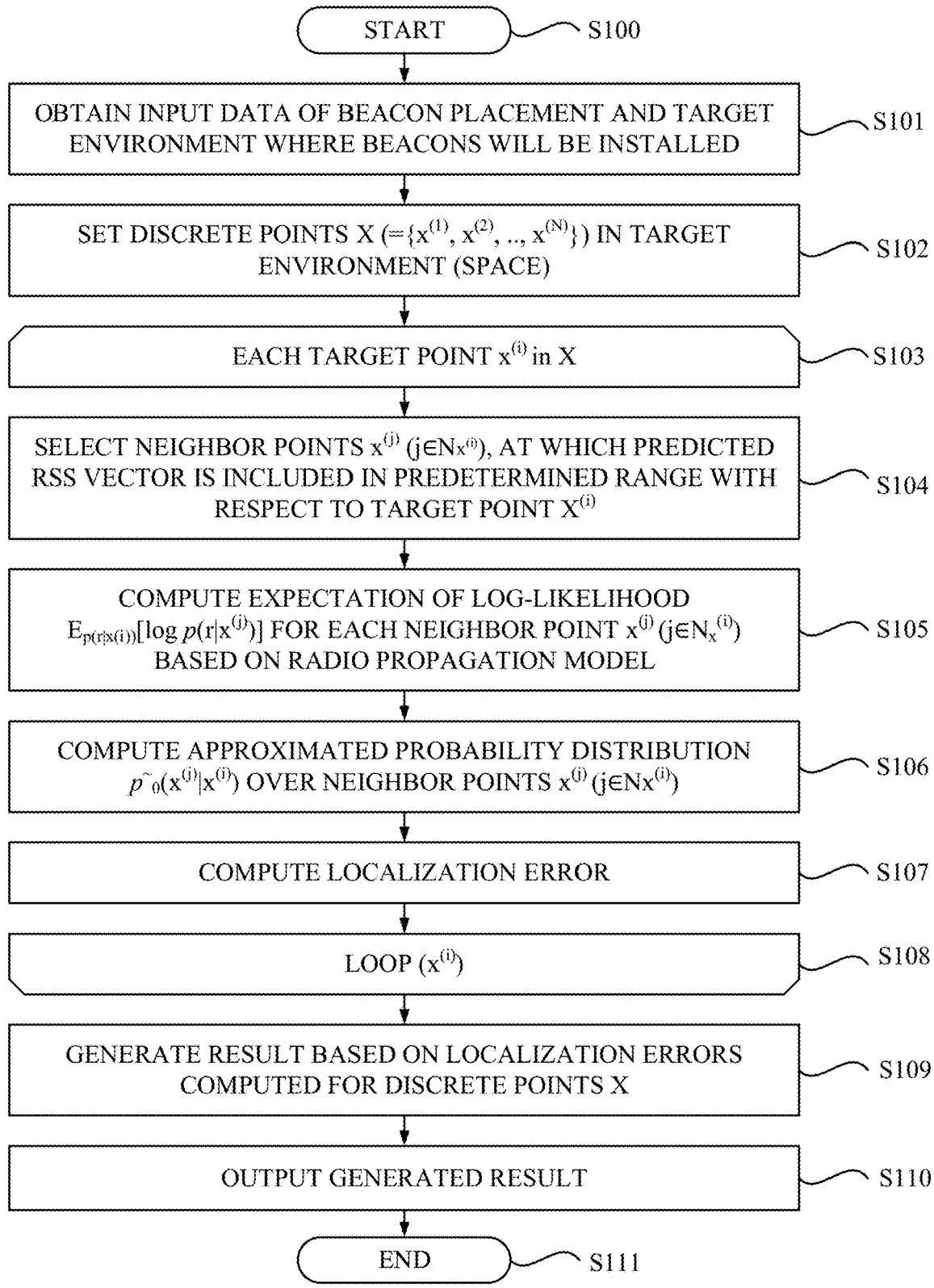
FIG. 4 is a flowchart depicting a process for estimating localization errors for given beacon placement according to some embodiments of the present disclosure.

Hereinafter, referring to FIGS. 4-6, a novel process for estimating a localization error for given beacon placement according to some embodiments of the present disclosure is described. FIG. 4 is a flowchart depicting the novel process for the localization error estimation. The process shown in FIG. 4 may be performed by processing circuitry such as a processing unit of a computer system that implements the localization error estimation system 110 shown in FIG. 1 and its modules 112-118 shown in FIG. 2.

The process shown in FIG. 4 may begin at step S100 in response to receiving a request for localization error estimation from an operator, for example.

At step S101, the processing unit may obtain input data of the beacon placement and the target environment where the beacons will be installed. The request received at step S100 may specify the condition of the localization error estimation, including the beacon placement and the target environment. At step S102, the processing unit may set discrete points X (={x(1), x(2), ..., x(N)}) in the target environment.

Figure 5:
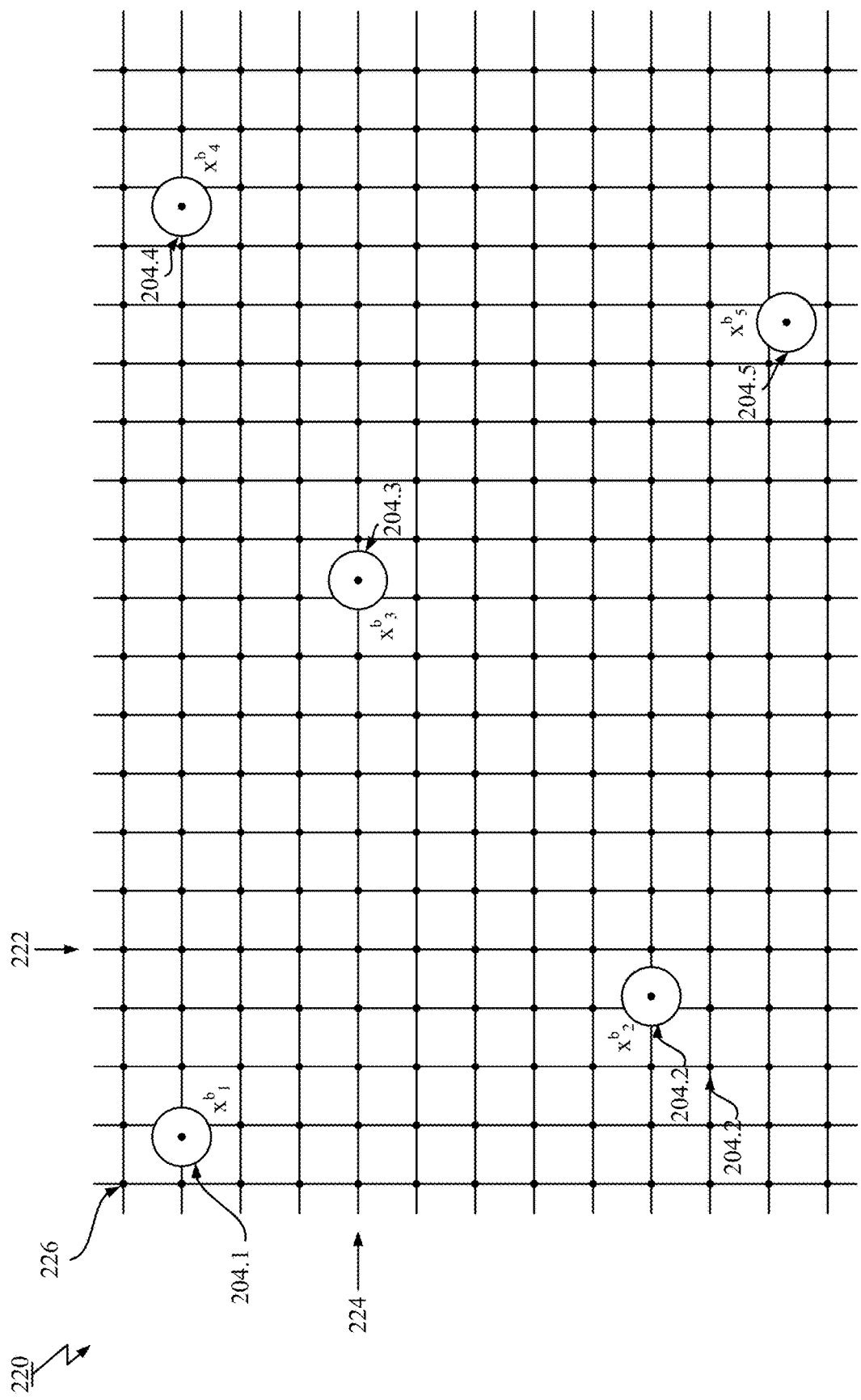
FIG. 5 illustrates a schematic of discrete points and the beacon placement set in a target environment according to some embodiments of the present disclosure.

FIG. 5 illustrates a schematic of discrete points and the beacon placement set in the target environment. FIG. 5 may describe a case of using the square grid or lattice. In FIG. 5, a set of vertical lines 222 and a set of horizontal lines 224 may be defined in the target environment 220. The vertical lines 222 and the horizontal lines 224 may have predetermined spacing, respectively. A grid point 226 may be defined as an intersection of the vertical and horizontal lines 222, 224. In FIG. 5, a set of beacons (i=1, ... M) 204.1, 204.2, 204.3, 204.4, 204.5 up to 204.n are placed in the target environment and the beacon placement is represented by Xb(=(xb1, ..., xbM)) where the position of the beacon (i), xbi, is given in the two-dimensional coordinates (xbi, ybi)T.

In some embodiments, the domain of the location x in the target environment may be discretized into equally spaced grid points, especially the square lattice. However, the way of discretizing the domain of x in the target environment may not be limited to the square lattice. In some embodiments, equally spaced grid points other than the square lattice such as hexagonal lattice and non-uniformly spaced discrete points may also be contemplated.

Referring back to FIG. 4, the loop from step S103 to step S108 may be performed by the processing unit for each discrete point x(i) in the set X. A discrete point of interest that is processed at the current loop may be referred to as a target point (location) x(i).

At step S104, the processing unit may select neighboring points (locations) x(j) (j is included in Nx(i)) for the target point x(i), at which a RSS vector r(x(j)) predicted at the neighboring point x(j) may be included in a predetermined range with respect to the target point x(i). The predetermined range may be determined by an RSS vector r(x(i)) predicted at the target point x(i) by using the radio wave propagation model 150.

In some embodiments, a j-th point x(j) satisfying the following condition: r(x^((i)))−3 σ≤r(x^((j)))≤r(x^((i)))+3σ is identified as a neighboring point and its index j is added to the set of indices neighbor to x(i), Nx(i). A subset of elements satisfying the aforementioned condition for all components of the RSS vector may be extracted from the set X.

Note that the extraction of the subset from the set X may be optional. However, the extraction of the subset may be preferably performed in order to balance the computational cost with respect to the number of beacons. As the number of beacons increases, the computational cost typically tends to increase, however the accuracy also improves. Hence, the number of neighboring points required to be evaluated would be reduced. Therefore, the increase in the computation cost according to an increase in the number of beacons may be suppressed by extracting the neighboring points x(j) from among the set of the discrete points X.

Figure 6:
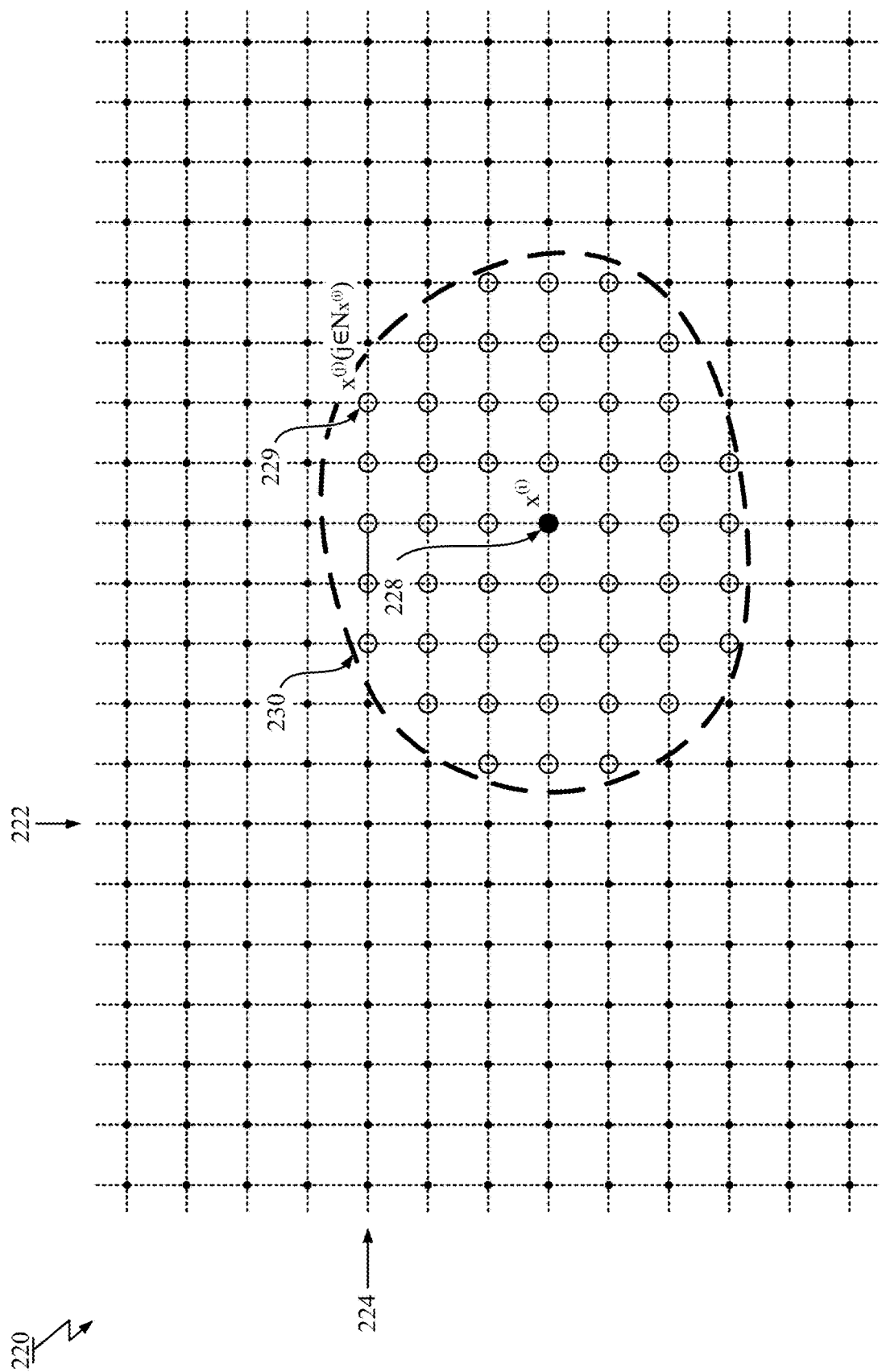
FIG. 6 illustrates a way of extracting neighbor points around a target point in a target environment according to some embodiments of the present disclosure.

FIG. 6 illustrates a way of extracting neighbor points x(j) around the target point x(i) 228 in the target environment 220. As illustrated in FIG. 6, neighbor points x(j) 229 included in a predetermined range 230 given by the target point x(i) may be extracted to generate the subset (Nx(i)). Note that the grid for the target point x(i) and the grid for the neighboring points x(j) may be shared in some embodiments. However, in some embodiments, the grid for the neighboring points x(j) may be different from the grid for the target point x(i) as illustrated in FIG. 7.

Figure 7:
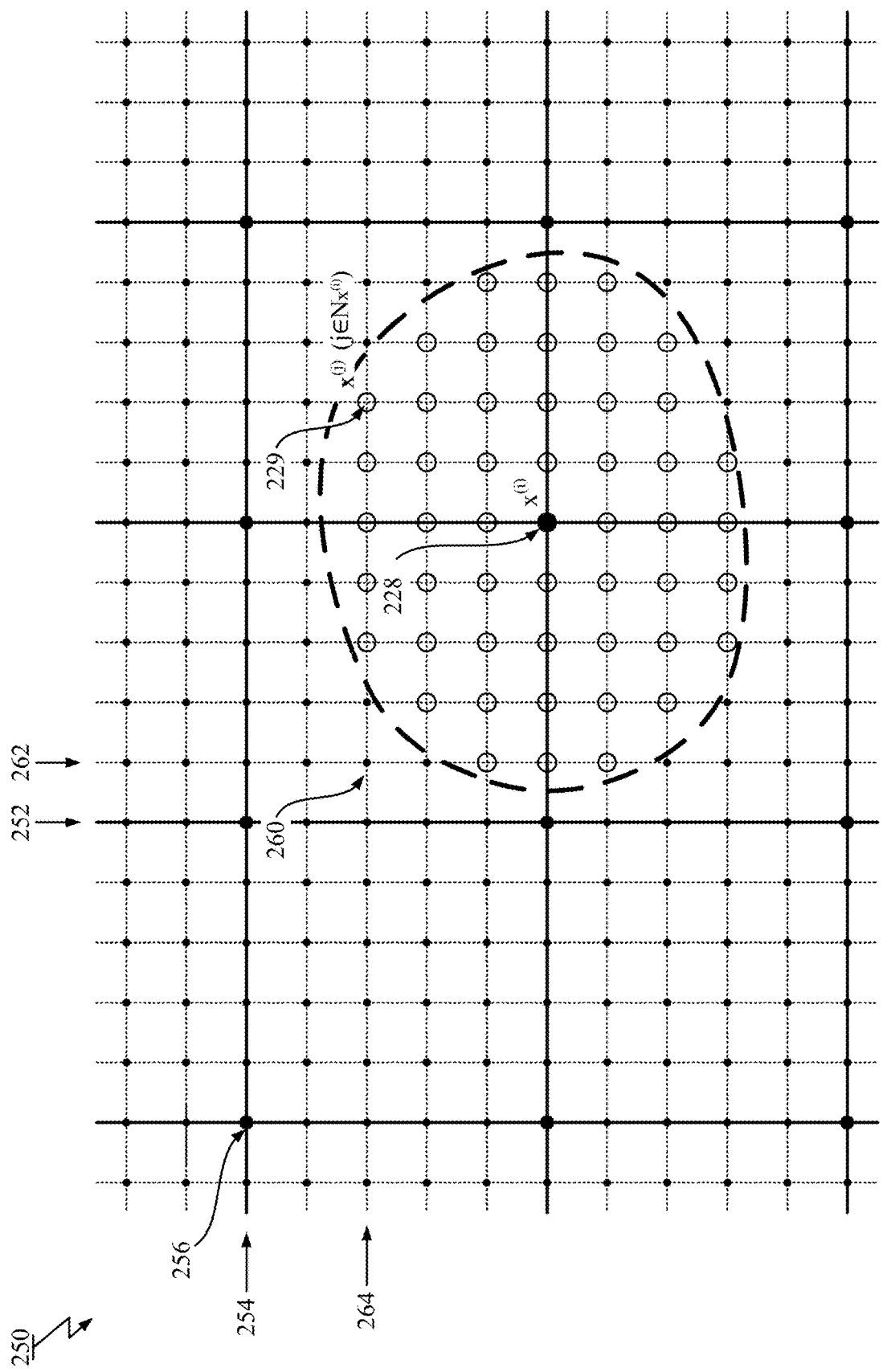
FIG. 7 illustrates a way of extracting neighbor points around a target point in a target environment according to some embodiments of the present disclosure.

FIG. 7 illustrates a way of extracting neighboring points around a target point in a target environment 250 according to some embodiments. A first set of vertical lines 252 and a first set of horizontal lines 254 are defined in the target environment 220. As shown in FIG. 7, a second set of vertical lines 262 and a second set of horizontal lines 264 are also defined. A grid point 256 for the target point x(i) is defined as an intersection of the first vertical and horizontal lines 252, 254. A grid point 260 for the neighboring points x(j) is defined as an intersection of the second vertical and horizontal lines 262, 264. In the embodiment shown in FIG. 7, the grid for the neighboring point x(j) may be denser than the grid for the target point x(i).

Referring back to FIG. 4, at step S105, the processing unit may calculate the arithmetic expectation of the log-likelihood Ep(r|x(i))[log p(r|x^(j))] for each neighbor point x^(j) (j is included in Nx(i)) based on the radio wave propagation model 150. The expectation of the log-likelihood Ep(r|x(i)) [log p(r|x^(j))] for each neighbor point x^(j) before the normalization may be set to an array f(x(j); x(i)) stored in a memory space.

At step S106 the processing unit may compute an approximated probability p~0(x^(j)|x(i)) of an estimated location x^(j) conditioned on the target location x(i) for each of the neighbor points x^(j) (j is included in the subset Nx(i)) by conducting the normalization as follows:

$$\tilde{p}(x^{(j)} \mid x^{(i)}) \frac{\exp[f(x^{(j)}; x^{(i)})]}{\sum_{k \in N_x} \exp[f(x^{(k)}; x^{(i)})]}$$

Note that the normalization may be conducted so that the function p~0(x^(j)|x(i)) may satisfy the normalization condition, thereby treating the function p~0(x^(j)|x(i)) as a probability. The normalization may be performed. However, in some embodiments, the normalization may be omitted. The distribution of f(x(j);x(i)) may be generally obtained such that it becomes high near the target location x(i) and becomes lower as the distance from the target location x(i) increases. The probability p~0(x^(j)|x(i)) may be somehow calculated by taking the shape 270 (broaden or narrow, curvature, etc.) of the distribution f(x(j);x(i)) around the target location x(i) 258 into account.

At step S107 the processing unit may compute an evaluation metric by using the approximated probability distribution p~0(x^(j)|x(i)). MSE(x(i)) can be calculated as follows:

$$E[(\hat{x} - x^{(i)})^2] \approx \sum_{i \in N_x} (x^{(j)} - x^{(i)})^2 \tilde{p}(x^{(j)} \mid x^{(i)})$$

Another evaluation metric, RMSE(x(i)), can be computed as follows:

$$\widehat{\mathrm{RMSE}}(x^{(i)}) = \sqrt{E[(\hat{x} - x^{(i)})^2]}$$

When the process from step S104 to step S107 has been performed for every discrete point x(i) in the set X, the process may exit the loop and proceed to step S109.

At step S109, the processing unit may generate a result based on the evaluation metrics computed for the discrete points x(i) in the set X. At step S110, the processing unit may output the generated result and the process may end at step S111.

According to the aforementioned embodiments, a novel technique capable of evaluating placement of devices with balanced computational cost and evaluation accuracy may be provided, as will also be demonstrated in experimental study section in later.

In terms of the evaluation of the beacon placement, a related technology that quantifies localization accuracy by using a lower bound of localization errors (Cramér-Rao Lower Bound) defined by a radio wave propagation model such as LDPL model and the geometric arrangement of a receiver and beacons may be relevant. The lower limit for the covariance of unbiased estimation of a location x^ (Cramér-Rao Lower Bound) may be given by the inverse of FIM (Fisher Information Matrix), J(x). For example, trace (J(x)−1), the lower limit of the mean square error, may be used as a metric to assess the localization accuracy.

However, the related technology is not suitable for designing beacon placement because the technology is only applicable to evaluating the localization accuracy when a location can be estimated precisely from observed RSS values and it is difficult to evaluate the localization accuracy when localization accuracy is low. Specifically, the related technology may be only valid when the probability density function of the estimated location can be approximated by a normal distribution. A catastrophic error occurs when it is difficult to approximate the probability density of the estimated location with the normal distribution. Therefore, it may be difficult to evaluate localization accuracy accurately under conditions where the beacons are sparsely distributed or a receiver is very close to the beacon.

In contrast, the novel localization error estimation according to one or more embodiments of the present disclosure may provide a way to evaluate the localization accuracy with reasonable computational cost more accurately than the related technology that quantifies the localization accuracy by using the lower bound of localization error.

In the aforementioned embodiments, computer-implement methods, computer systems and computer program products for evaluating beacon placement may be used for the indoor localization where the localization error for the target location is computed as the evaluation metric. However, the novel placement evaluation technique may be applicable to evaluating base station placement used for outdoor localization, Furthermore, the novel placement evaluation technique may be applicable to evaluating placement of a set of signal emitting devices that emit signals in a form of any physical phenomenon other than the radio wave (e.g., sound waves, ultrasonic waves, electromagnetic waves, and the like). The novel placement evaluation technique may be applicable to an evaluation metric for applications other than the localization error.

Experimental Study

A program implementing the localization estimation system shown in FIGS. 1 and 2 and the process described in FIG. 4 according to some embodiments is coded and executed for given conditions.

Experiment I

A target environment of 40 m×40 m area where 25 beacons are placed randomly was defined. The interval between two adjacent grids may be 1 m in both vertical and horizontal dimensions. The grids may be shared for both the target location x(i) and the neighboring locations x^(j) around the target location x(i).

Instead of the true localization error, the root mean square error may be computed as a scaler evaluation metric for each grid point by a Monte Carlo simulation. More specifically, for each iteration, an RSS vector y(1) may be generated for a given location x from an observation model p(y|x) with normally distributed random numbers and a maximum likelihood estimation (MLE) of the location x^(1)MLE is found for the generated RSS vector y(1). The iteration may be repeated NMC times to compute the RMSE for each location x, which is referred to as RMSEMC (x).

As a Comparative Example 1, an estimate value of the RMSECE1 (x) may be computed for each location x by a method of the related technology (referred to as the related method) that quantifies the localization accuracy based upon the lower bound of localization error (Bishop, Adrian N., et al. "Optimality analysis of sensor-target localization geometries." Automatica 46.3 (2010): 479-492).

As an Example 1, an estimate value of the RMSEE1 (x) may be computed for each location x by the novel localization error estimation described above (referred to as the proposed method).

A computation time may be measured by a computer with an Intel® Core™ i7-6820HQ CPU (2.70 GHz) for both Comparative Example 1 and Example 1. Also the correlation coefficient between RMSEMC (x) may be estimated by the Monte Carlo simulation and the estimated value of the localization error for both Comparative Example 1 RMSECE1 (x) and Example 1 RMSEE1 (x) are computed. The correlation coefficients and computational times for Example 1 and Comparative Example 1 may be summarized in Table 1.

TABLE 1

|  | Comparative Example 1 (related method) | Example 1 (proposed method) |
| --- | --- | --- |
| Correlation coefficient | 0.57 | 0.88 |
| Computation time | 0.008 s | 0.24 s |

Figure 8:
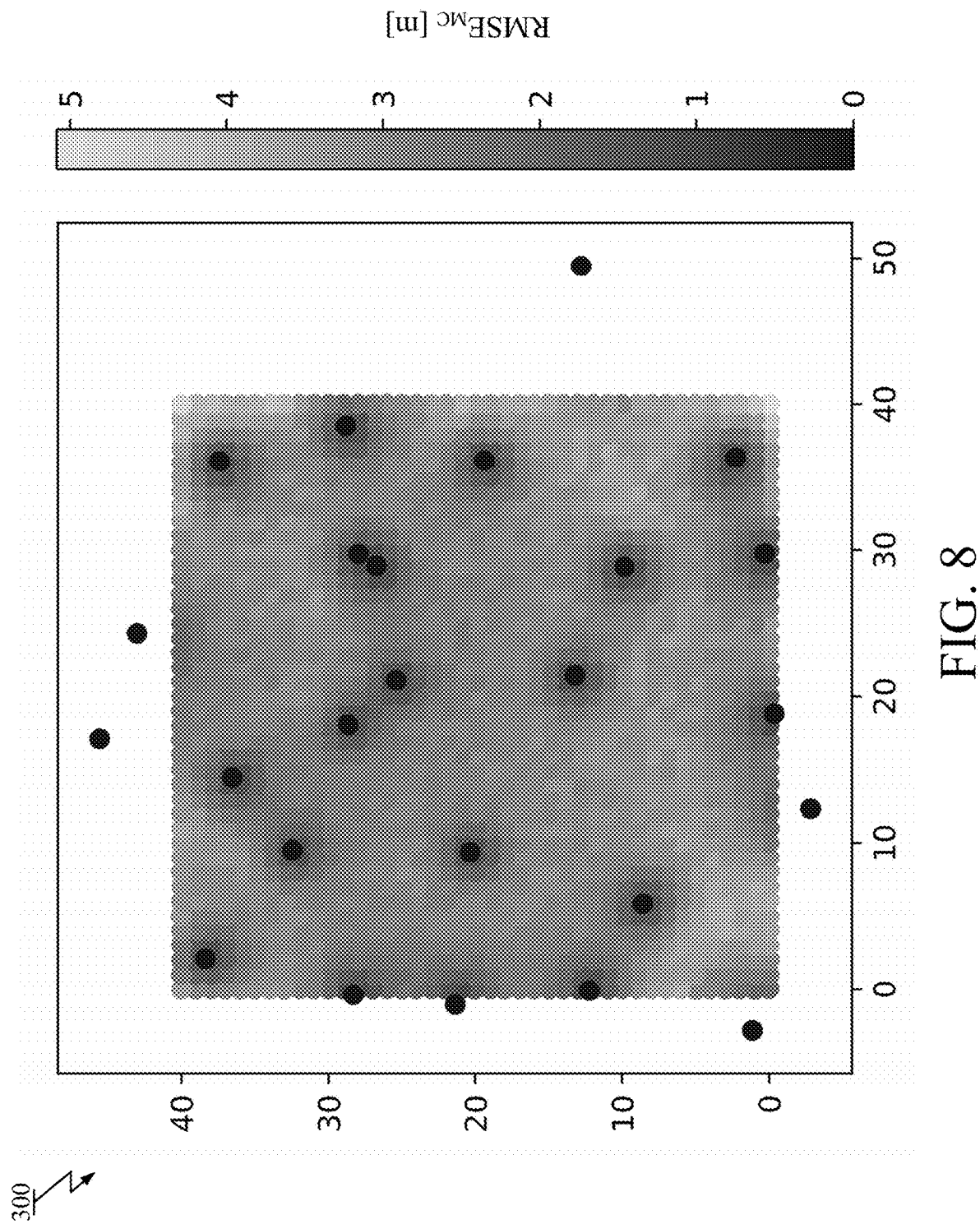
FIG. 8 shows a map of a distribution of localization errors RMSEMC computed by Monte Carlo simulation for an environment of 40 m×40 m areas where 25 beacons are placed randomly.

FIG. 8 shows a map 300 of a distribution of the localization error RMSEMC(x) computed by the Monte Carlo simulation for the target environment of 40 m×40 m areas where the 25 beacons are placed randomly. In the map 300, the positions of the beacons may be indicated by black circles and the grayscale value represents RMSEMC.

Figure 9:
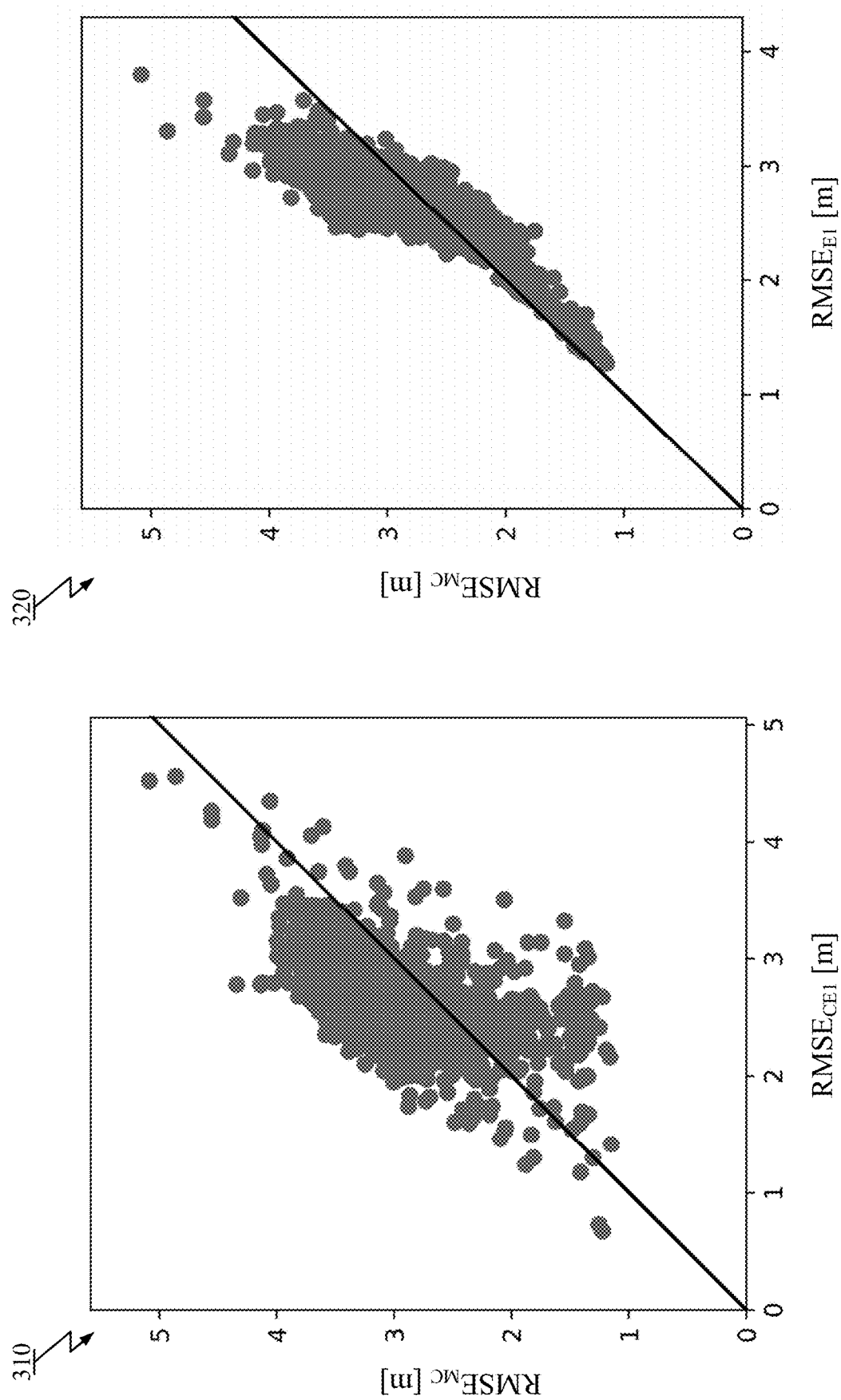
FIG. 9 shows plots representing correlations of RMSECE1 computed by a related method and RMSEE1 computed by a proposed method with respect to RMSEMC computed by Monte Carlo simulation in the environment shown in FIG. 8.

FIG. 9 depicts a first plot 310 represents correlation of the RMSECE1 computed by the related method with respect to the RMSEMC computed by the Monte Carlo simulation in the environment shown in FIG. 8. Also depicted may be a second plot 320 represents correlation of the RMSEE1 computed by the proposed method with respect to the RMSEMC in the environment shown in FIG. 8. The correlation coefficient may represent evaluation accuracy of the localization error estimation. A large value of the correlation coefficient may indicate high evaluation accuracy, indicating better localization error estimation. In the plot shown in FIG. 9, ideally, the localization error may be estimated as a reasonable value so that the points are plotted on a diagonal line.

As shown in TABLE 1 and FIG. 9, it may be demonstrated that the proposed method is able to estimate the localization error distribution sufficiently fast in practical use and with more accuracy than other methods. Note that the reason why the computation time for the related method (Comparative Example 1) may be short is that the related method evaluates the localization error analytically after approximating the probability density of the estimated location with the normal distribution.

Experiment II

A target environment of 30 m×30 m area where 9 beacons are placed randomly was defined. The interval of the grids was 1 m and the grids are shared for both the target location x(i) and the neighboring locations x^(j).

The baseline RMSEMC may be computed by a Monte Carlo simulation. As for Comparative Example 2, an estimate value of the RMSECE2 (x) may be computed by the related method. As for Example 2, an estimate value of the RMSEE2 (x) may be computed for each location x by the proposed method.

Figure 10:
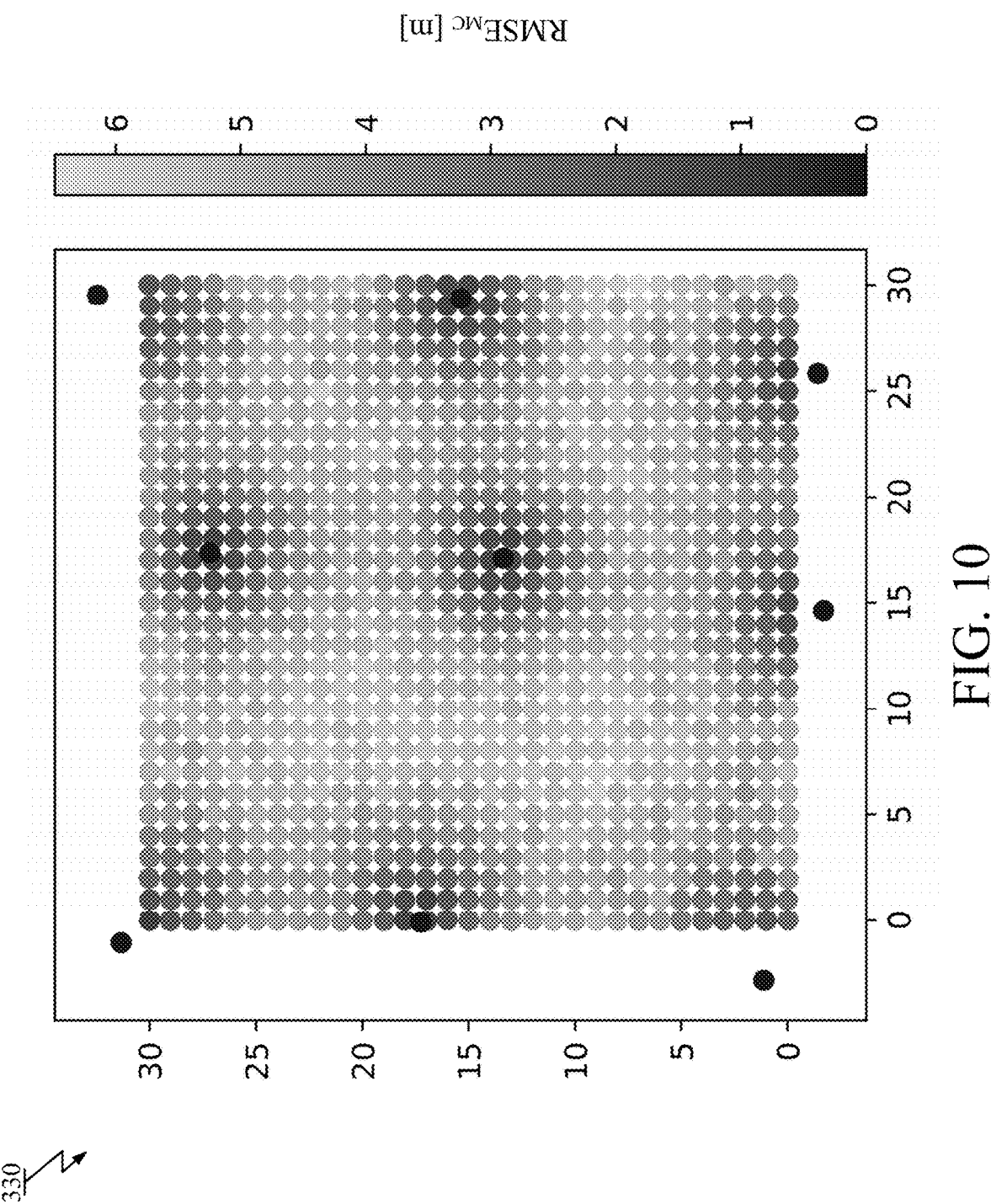
FIG. 10 shows a map of a distribution of localization errors RMSEMC computed by Monte Carlo simulation for an environment of 30 m×30 m areas where 9 beacons are placed randomly.

FIG. 10 shows a map 330 of a distribution of the localization error RMSEMC(x) computed by the Monte Carlo simulation for the target environment of 30 m×30 m areas where the 9 beacons are placed randomly.

Figure 11:
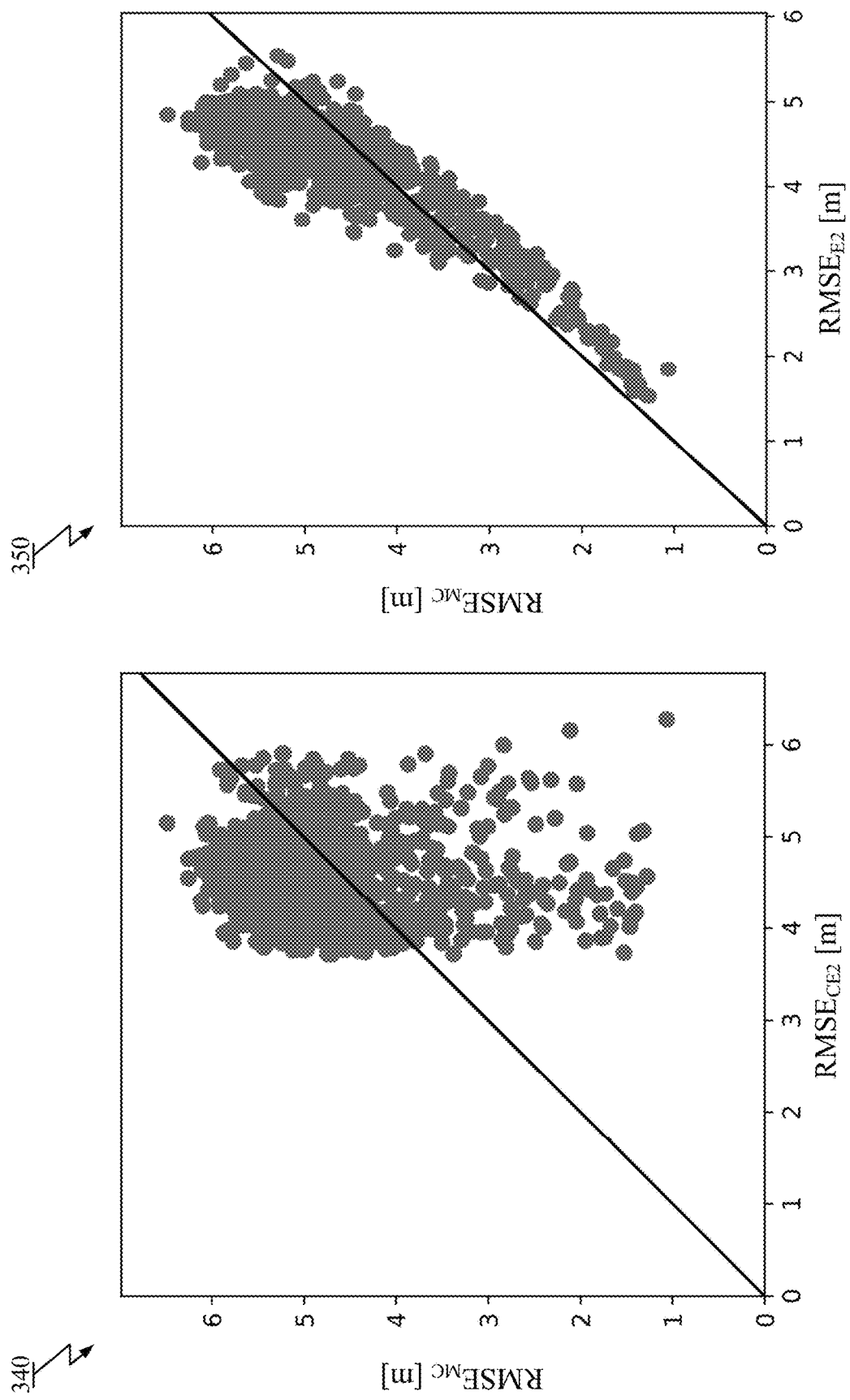
FIG. 11 shows plots representing correlations of RMSECE2 computed by a related method and RMSEE2 computed by a proposed method with respect to RMSEMC computed by Monte Carlo simulation in the environment shown in FIG. 10.

In FIG. 11, the first plot 340 represents correlation of the RMSECE2 of the related method with respect to the RMSEMC in the environment shown in FIG. 10. The second plot 350 may represent correlation of the RMSEE2 of the proposed method with respect to the RMSEMC in the environment shown in FIG. 10. As shown FIG. 11, even in the environment where the beacons are sparsely distributed, the proposed method is able to estimate the localization error distribution more accurately than the related method. In contrast, the performance of the related method degrades clearly under the sparse condition.

Although the advantages obtained with respect to the one or more specific embodiments according to the present disclosure have been described, it should be understood that some embodiments may not have these potential advantages, and these potential advantages are not necessarily required of all embodiments.

Further, in some embodiments of the present disclosure additionally a method may include a computer-implement method of evaluating placement of a set of devices in an environment. an evaluation metric may be calculated based on a function of an estimated location conditioned on a target location. The evaluation metric may be outputted. The evaluation metric may be computed by using a probability distribution, the probability distribution is calculated as an arithmetic mean of a probability distribution of the estimated location conditioned on a set of observation values with respect to the set of predicted observation values at the target location and approximated by the function and the function is obtained by replacing the arithmetic mean with a geometric mean.

Further, in some embodiments, the geometric mean may be normalized by a normalizing constant so that the function satisfies a normalization condition.

Computer Hardware Component

Figure 12:
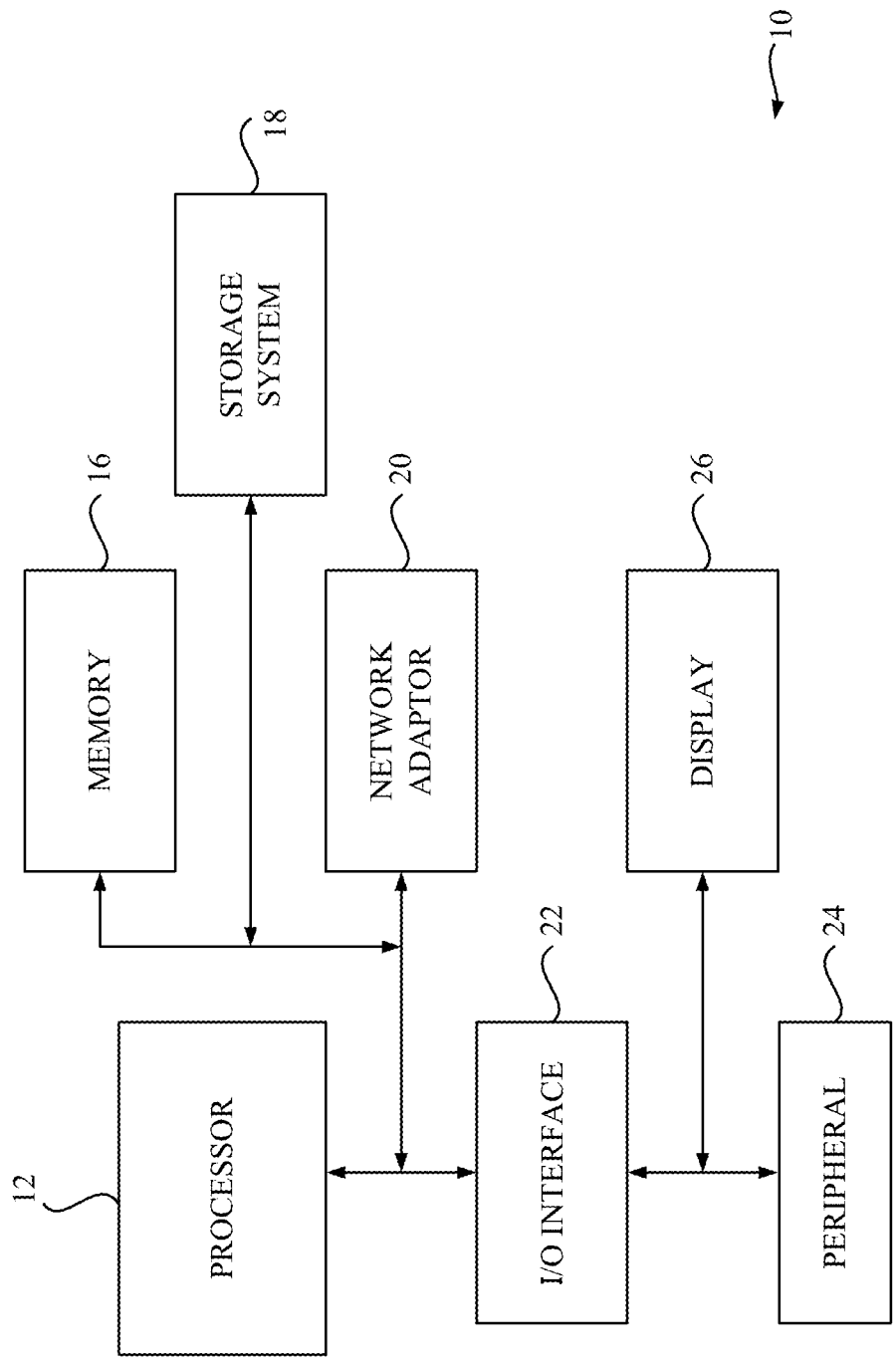
FIG. 12 depicts a schematic of a computer system according to one or more embodiments of the present disclosure.

Referring now to FIG. 12, a schematic of an example of a computer system 10, which may be used for the localization error estimation system 110, is shown. The computer system 10 shown in FIG. 12 may be implemented as computer system. The computer system 10 is only one example of a suitable processing device and is not intended to suggest any limitation as to the scope of use or functionality of embodiments of the disclosure described herein. Regardless, the computer system 10 may be capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 12, the computer system 10 may be shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and may include both volatile and non-volatile media, removable and non-removable media.

The memory 16 may include computer system readable media in the form of volatile memory, such as random access memory (RAM). The computer system 10 may further include other removable/non-removable, volatile/non-volatile computer system storage media. By way of example only, the storage system 18 may be provided for reading from and writing to a non-removable, non-volatile magnetic media. The storage system 18 may include at least one program product having a set (e.g., at least one) of program modules that are configured to carry out the functions of embodiments of the disclosure.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the disclosure as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of evaluating placement of a set of devices in an environment, the method comprising:

providing a received signal strength (RSS) propagation model of the environment;

providing, by the RSS propagation model, an observation model represented by a conditional probability distribution $p(r|x)$ of observing an RSS vector r conditioned on a given location in the environment;

given the observation model, calculating a localization error based on a function $\tilde{p}_0(\hat{x}|x)$ that approximates a probability distribution $p(x^{\wedge}|x)$ as follows:

$$\tilde{p}_0(\hat{x};x) = \frac{G_{p(r|x)}[p(\hat{x}|r)]}{\int G_{p(r|x)}[p(\hat{x}|r)]d\hat{\xi}} = \frac{\exp[E_{p(r|x)}[\log p(r|\hat{x})]]}{\int \exp[E_{p(r|x)}[\log p(r|\hat{\xi})]]d\hat{\xi}} \mid$$

$$\because G[X] = \lim_{n \to \infty}\left(\prod_{i=1}^{n} X_i\right)^{\frac{1}{n}} = \exp\left[\lim_{n \to \infty} \frac{1}{n} \sum_{i=1}^{n} \log X_i\right] = \exp[E[\log X_i]];$$

obtaining target locations represented by a discrete set of points X defined in the environment;

computing evaluation metrics for each target location x(i) of the target locations, wherein computing each evaluation metric comprises:

predicting, by the observation model, an RSS vector r(x(i)) for the target location x(i) in the discrete set of points X;

selecting a subset of points Nx(i) from the discrete set of points X within a predetermined range of the RSS vector r(x(i)) predicted for the target location x(i);

calculating an approximate probability distribution $\tilde{p}_0(\hat{x}(j)|x(i))$ of neighboring locations $\hat{x}(j)$, where j is included in Nx(i), conditioned on the target location x(i), wherein the calculating comprises computing, for each neighboring location $\hat{x}(j)$, an expectation of a log-likelihood; and evaluating a variance of the approximate probability distribution $\tilde{p}_0(\hat{x}(j)|x(i))$ calculated for each of the neighboring locations $\hat{x}(j)$.

2. The method of claim 1, wherein the approximate probability distribution $\tilde{p}_0(\hat{x}(j)|x(i))$ is calculated by computing a geometric mean Gp(r|x) and wherein the calculating further comprises computing an exponential of the expectation.

3. The method of claim 2, wherein the geometric mean is normalized by a normalizing constant.

4. The method of claim 3, wherein the normalizing constant is calculated based on expectations computed for each of the neighboring locations $\hat{x}(j)$.

5. The method of claim 1, wherein the method further comprises:

varying the target location within the set of discrete points X; and outputting a localization error distribution map for the environment based on the evaluation metrics.

6. The method of claim 1, wherein the method further comprises:

varying the target location x(i) within the set of discrete X; and outputting an index representing the placement of the set of devices in the environment based on a statistic of the evaluation metrics.

7. The method of claim 1, wherein the set of devices comprises a set of signal emitting devices corresponding to observed RSS vectors, wherein each signal emitting device comprises a beacon used for localization performed by a receiver, each observed RSS vector represents signal strength received by the receiver, and each evaluation metric represents a localization error.

8. The method of claim 1, wherein the method further comprises:

placing, based on the evaluation metric, a beacon within the target environment.

9. The method of claim 1, wherein each discrete point from the subset Nx(i) satisfies the following condition: $r(\hat{x}(i))-3\sigma \leq r(\hat{x}(i))+3\sigma$.

10. The method of claim 1, wherein the calculating the approximate probability distribution $\tilde{p}_0(\hat{x}(j)|x(i))$ comprises conducting a normalization as follows:

$$\tilde{p}(x^{(j)} \mid x^{(i)}) = \frac{\exp[f(x^{(j)}; x^{(i)})]}{\sum_{k \in N_x} \exp[f(x^{(k)}; x^{(i)})]}$$

11. The method of claim 10, wherein the evaluation metric is a mean squared error defined as a variance of the approximate probability distribution $\tilde{p}_0(\hat{x}(j)|x(i))$ as follows:

$$E[(\hat{x}-x^{(i)})^2] \approx \sum_{i \in N_x} (x^{(j)}-x^{(i)})^2 \tilde{p}(x^{(j)} \mid x^{(i)})$$

12. The method of claim 1, further comprising generating a result based on the computed evaluation metrics for the each target location x(i).

13. The method of claim 12, wherein the generating the result comprises outputting a map of localization error distribution over the target environment.

14. The method of claim 13, further comprising outputting an indication of a weak point in the environment based on the map of the localization error distribution.

15. The method of claim 1, wherein the observation model is given as follows:

$$p(r \mid x) = \sum_{i=1}^{M} p(r_i \mid x) = \prod_{i=1}^{M} \frac{1}{\sqrt{2\pi}} \exp\left[-\frac{(r_i - m_i(x))^2}{2\sigma^2}\right],$$

where $m_i(x) = P_0 - 10\gamma' \log d_i(x)$

16. A computer system for evaluating placement of a set of devices in an environment, by executing program instructions, the computer system comprising:
a memory storing the program instructions;
processing circuitry in communications with the memory for executing the program instructions, wherein the processing circuitry is configured to:
provide a received signal strength (RSS) propagation model of the environment;
provide, by the RSS propagation model, an observation model represented by a conditional probability distribution p(r|x) of observing an RSS vector r conditioned on a given location in the environment;
given the observation model, calculate a localization error based on a function $\tilde{p}_0(\hat{x}|x)$ that approximates a probability distribution p(x^|x) as follows:

$$\tilde{p}_0(\hat{x}; x) = \frac{G_{p(r|x)}[p(\hat{x} \mid r)]}{\int G_{p(r|x)}[p(\hat{x} \mid r)]d\hat{\xi}} = \frac{\exp\left[E_{p(r|x)}[\log p(r \mid \hat{x})]\right]}{\int \exp\left[E_{p(r|x)}[\log p(r \mid \hat{\xi})]\right]d\hat{\xi}} \mid$$

$$\because G[X] = \lim_{n\to\infty}\left(\prod_{i=1}^{n} X_i\right)^{\frac{1}{n}} = \exp\left[\lim_{n\to\infty}\frac{1}{n}\sum_{i=1}^{n} \log X_i\right] = \exp[E[\log X_i]];$$

obtain target locations represented by a discrete set of points X defined in the environment;
compute evaluation metrics for each target location x(i) of the target locations, wherein computing each evaluation metric comprises:
predicting, by the observation model, an RSS vector r(x(i)) for the target location x(i) in the discrete set of points X;
selecting a subset of points Nx(i) from the discrete set of points X within a predetermined range of the RSS vector r(x(i)) predicted for the target location x(i);
calculating an approximate probability distribution $\tilde{p}_0(\hat{x}(j)|x(i))$ of neighboring locations $\hat{x}(j)$, where j is included in Nx(i), conditioned on the target location x(i), each estimated location wherein the calculating comprises computing, for each neighboring location $\hat{x}(j)$, an expectation of a log-likelihood; and
evaluating a variance the approximate probability distribution $\tilde{p}_0(\hat{x}(j)|x(i))$ calculated for each of the neighboring locations $\hat{x}(j)$.

17. The system of claim 16, wherein the approximate probability distribution $\tilde{p}_0(\hat{x}(j)|x(i))$ is calculated by computing a geometric mean Gp(r|x) and wherein the calculating further comprises computing an exponential of the expectation.

18. The system of claim 17, wherein the geometric mean is normalized by a normalizing constant, and the normalizing constant is calculated based on expectations computed for each of the neighboring locations $\hat{x}(j)$.

19. The system of claim 16, wherein the processing circuitry is further configured to:
vary the target location within the set of discrete points from the set of locations X; and
provide, based on the computed evaluation metrics, at least one selected from the group consisting of an evaluation metric for a given location in the environment, a localization error distribution map for the environment, and indices each representing quality of the placement of the set of devices in the environment based on a statistic of the evaluation metrics calculated for the discrete points.

20. A computer program product for evaluating placement of a set of devices in an environment, the computer program product comprising:
one or more computer readable storage media; and
program instructions collectively stored on the one or more computer readable storage media, the program instructions configured to:
provide a received signal strength (RSS) propagation model of the environment;
provide, by the RSS propagation model, an observation model represented by a conditional probability distribution p(r|x) of observing an RSS vector r conditioned on a given location in the environment;
given the observation model, calculate a localization error based on a function $\tilde{p}_0(\hat{x}|x)$ that approximates a probability distribution p(x^|x) as follows:

$$\tilde{p}_0(\hat{x}; x) = \frac{G_{p(r|x)}[p(\hat{x} \mid r)]}{\int G_{p(r|x)}[p(\hat{x} \mid r)]d\hat{\xi}} = \frac{\exp\left[E_{p(r|x)}[\log p(r \mid \hat{x})]\right]}{\int \exp\left[E_{p(r|x)}[\log p(r \mid \hat{\xi})]\right]d\hat{\xi}} \mid$$

$$\because G[X] = \lim_{n\to\infty}\left(\prod_{i=1}^{n} X_i\right)^{\frac{1}{n}} = \exp\left[\lim_{n\to\infty}\frac{1}{n}\sum_{i=1}^{n} \log X_i\right] = \exp[E[\log X_i]];$$

obtain target locations represented by a discrete set of points X defined in the environment;
compute evaluation metrics for each target location x(i) of the target locations, wherein computing each evaluation metric comprises:
predicting, by the observation model, an RSS vector r(x(i)) for the target location x(i) in the discrete set of points X;
selecting a subset of points Nx(i) from the discrete set of points X within a predetermined range of the RSS vector r(x(i)) predicted for the target location x(i);
calculating an approximate probability distribution $\tilde{p}_0(\hat{x}(j)|x(i))$ of neighboring locations $\hat{x}(j)$, where j is included in Nx(i), conditioned on the target location x(i), wherein the calculating comprises computing, for each neighboring location $\hat{x}(j)$, an expectation of a log-likelihood; and
evaluating a variance of the approximate probability distribution $\tilde{p}_0(\hat{x}(j)|x(i))$ calculated for each of the neighboring locations $\hat{x}(j)$.

* * * * *